United States Patent [19]
Lee et al.

[11] Patent Number: 5,802,037
[45] Date of Patent: Sep. 1, 1998

[54] OPTICAL DETECTOR WITH TWO DETECTING REGIONS FOR REPRODUCING AND RECORDING INFORMATION ON TWO KINDS OF DISKS HAVING DIFFERENT THICKNESSES

[75] Inventors: Chul-woo Lee, Seoul; Kyung-hwa Rim, Suwon; Chong-sam Chung, Sungnam; Kun-ho Cho, Suwon; Jang-hoon Yoo, Seoul; Soo-yeul Jung, Kunpo, all of Rep. of Korea

[73] Assignee: Samsung Electronics Co., Ltd., Kyungki-do, Rep. of Korea

[21] Appl. No.: 708,988

[22] Filed: Sep. 6, 1996

[30] Foreign Application Priority Data

Oct. 4, 1995 [KR] Rep. of Korea .............. 95-33912

[51] Int. Cl.⁶ ...................................... G11B 7/00
[52] U.S. Cl. ............. 369/120; 369/44.23; 369/44.42; 369/94
[58] Field of Search ............... 369/120, 44.23, 369/44.42, 94; 356/222, 343

[56] References Cited

U.S. PATENT DOCUMENTS

| | | |
|---|---|---|
| 2,724,305 | 11/1955 | Brandt . |
| 3,913,076 | 10/1975 | Lehureau et al. . |
| 3,971,002 | 7/1976 | Bricot et al. . |
| 4,465,369 | 8/1984 | Saegusa et al. .............. 356/222 |
| 4,641,296 | 2/1987 | Mizunoe et al. ............ 369/44.16 |
| 4,654,838 | 3/1987 | Sugiki ......................... 369/44.42 |
| 4,695,158 | 9/1987 | Kotaka et al. ................ 369/120 |
| 4,704,024 | 11/1987 | Tsunekawa ................... 356/222 |
| 4,737,946 | 4/1988 | Yamashita et al. ............ 369/112 |
| 4,816,665 | 3/1989 | Hsu ........................... 369/44.42 |
| 4,882,478 | 11/1989 | Hayashi et al. ............... 356/343 |
| 5,146,258 | 9/1992 | Bell et al. ................... 356/222 |
| 5,281,797 | 1/1994 | Tatsuno et al. ............... 369/118 |
| 5,502,708 | 3/1996 | Morimoto ..................... 369/120 |
| 5,532,999 | 7/1996 | Aikoh et al. ................. 369/120 |

FOREIGN PATENT DOCUMENTS

| | | |
|---|---|---|
| 0 199 565 A2 | 10/1986 | European Pat. Off. . |
| 0 610 055 A2 | 8/1994 | European Pat. Off. . |
| 5-325245 | 12/1993 | Japan . |
| 7-98431 | 4/1995 | Japan . |
| 1 603596 | 11/1981 | United Kingdom . |
| 2 157 524 | 10/1985 | United Kingdom . |
| WO 96/28816 | 9/1996 | WIPO . |

*Primary Examiner*—Tod R. Swann
*Assistant Examiner*—Kim-Kwok Chu
*Attorney, Agent, or Firm*—Burns, Doane, Swecker & Mathis, L.L.P.

[57] ABSTRACT

An optical pickup device which is capable of reproducing and recording information from/onto at least two kinds of discs having different thicknesses includes a light source, an objective lens provided along the light path from the light source facing the plane of a disc and having a predetermined effective diameter, a beam splitter provided between the objective lens and the light source, and a photodetector for detecting the beam split from the light splitter and reflected from the disc, wherein the photodetector has a first detection region and a second detection region provided in the peripheral portion of the first detection region. The optical pickup device is simplified and the manufacturing cost therefor is low. Also, by reducing the spherical aberration effect for the light, discs having different thicknesses can be used for a single disc drive.

8 Claims, 8 Drawing Sheets

OPTICAL DETECTOR WITH TWO DETECTING REGIONS FOR REPRODUCING AND RECORDING INFORMATION ON TWO KINDS OF DISKS HAVING DIFFERENT THICKNESSES

BACKGROUND OF THE INVENTION

The present invention relates to an optical pickup device for reproducing and recording information from an optical disc.

An optical pickup records and reproduces information such as video or audio data onto/from recording media, e.g., discs (or disks). A disc has a structure that an information-recorded surface is formed on a substrate. For example, the substrate can be made of plastic or glass. In order to read or write information from a high-density disc, the diameter of the optical spot must be very small. To this end, the numerical aperture of an objective lens is generally made large and a light source having a shorter wavelength is used. However, in case of using the shorter wavelength light source and an objective lens having a large numerical aperture (NA), a tilt allowance of the disc with respect to optical axis is reduced. The thus-reduced disc tilt allowance can be increased by reducing the thickness of the disc.

Assuming that the tilt angle of the disc is θ, the magnitude of a coma aberration coefficient $W_{31}$ can be obtained from:

$$W_{31} = -\frac{d}{2}\left(\frac{n^2(n^2-1)\sin\theta\cos\theta}{(n^2-\sin^2\theta)^{\frac{5}{2}}}\right)NA^3$$

where d and n represent the thickness and refractive index of the disc, respectively. As understood from the above relationship, the coma aberration coefficient is proportional to the cube of the numerical aperture (NA). Therefore, considering that the NA of the objective lens required for a conventional compact disc (CD) is 0.45 and that for a conventional digital video disc or digital versatile disc (DVD) is 0.6 (to accommodate the higher information density), the DVD has a coma aberration coefficient of about 2.34 times that of the CD having the same thickness for a given tilt angle. Thus, the maximum tilt allowance of the DVD is reduced to about half that of the conventional CD. In order to conform the maximum tilt allowance of the DVD to that of the CD, the thickness d of the DVD could be reduced.

However, such a thickness-reduced disc adopting a shorter wavelength (high density) light source, e.g., a DVD, cannot be used in a recording/reproducing apparatus such as a disc drive for the conventional CDS adopting a longer wavelength light source because a disc having an non-standard thickness is influenced by a spherical aberration to a degree corresponding to the difference in disc thickness from that of a normal disc. If the spherical aberration is extremely increased, the spot formed on the disc cannot have the light intensity needed for recording information, which prevents the information from being recorded precisely. Also, during reproduction of the information, the signal-to-noise (S/N) ratio is too low to reproduce the recorded information exactly.

Therefore, an optical pickup adopting a light source having a short wavelength, e.g., 650 nm, which is compatible for discs having different thicknesses, such as a CD or a DVD, is necessary.

For this purpose, research into apparatuses which can reproduce and record information from/onto at least two kinds of discs having different thicknesses with a single optical pickup device adopting a shorter wavelength light source is underway. Lens devices adopting a combination of a hologram lens and a refractive lens have been proposed in, for example, Japanese Patent Laid-Open Publication No. Hei 7-98431.

FIGS. 1 and 2 show the focusing of zero-order and first-order-diffracted light onto discs 3a and 3b having different thicknesses, respectively. In each figure, a hologram lens 1, provided with a pattern 11, and a refractive objective lens 2 are provided along the light path in front of discs 3a and 3b. The pattern 11 diffracts a light beam 4 from a light source (not shown) passing through hologram lens 1, to thereby separate the passing light into first-order-diffracted light 41 and zero-order light 40 each of which is focused to a different point on the optical axis with a different intensity by the objective lens 2. The two different focal points are the appropriate focus points on the thicker disc 3b and the thinner disc 3a, respectively and thus enable data read/write operations with respect to discs having different thicknesses.

However, in using such a lens system, the separation of the light into two beams (i.e., the zero order and first order light) by the hologram lens 1 lowers the utilizing efficiency of the actually used (reflected and partially twice diffracted, 1st order) light to about 15%. Also, during the read operation, since the information is included in only one of the two beams and the beam carrying no information is likely to be detected as noise. Moreover, the fabrication of such a hologram lens requires a high-precision process used in etching a fine hologram pattern, which increases manufacturing costs.

FIG. 3 is a schematic diagram of another conventional optical pickup device as disclosed in U.S. Pat. No. 5,281,797. This optical pick-up device includes a variable diaphragm 1a for varying the aperture diameter, so that data can be recorded onto a longer wavelength disc as well as a shorter wavelength disc, but with the discs having the same thickness, and information can be reproduced therefrom. The variable diaphragm 1a is installed between the objective lens 2 and a collimating lens 5. The variable diaphragm 1a controls a beam 4 emitted from a light source 9 and transmitted through a beam splitter 6, by appropriately adjusting the area of the beam passing region, i.e., the numerical aperture (NA). The diametral aperture of the variable diaphragm 1a is adjusted in accordance with the focused spot size on the disc being employed and always passes the light beam 4a of the central region but selectively passes or blocks the beam 4b of the peripheral region. In FIG. 3, a reference numeral 3 denotes a disc, a reference numeral 7 denotes a focusing lens and a reference numeral 8 denotes a photodetector.

In the optical device having the above configuration, if the variable diaphragm is formed by a mechanical diaphragm, its structural resonance characteristics change depending on the effective aperture of the diaphragm. The installation of the diaphragm onto an actuator for driving the objective lens becomes difficult in practice. To solve this problem, liquid crystals may be used for forming the diaphragm. This, however, greatly impedes the miniaturization of the system, deteriorates heat-resistance and endurance and increases manufacturing costs.

Alternatively, a separate objective lens for each disc may be provided so that a specific objective lens is used for a specific disc. In this case, however, since a driving apparatus is needed for changing lenses, the configuration becomes complex and the manufacturing cost increases accordingly.

SUMMARY OF THE INVENTION

It is an object of the present invention to provide an optical pickup device which is inexpensive and easily fabricated.

It is another object of the present invention to provide an optical pickup device whose light utilizing efficiency is enhanced and which can form small beam spots.

To accomplish the above objects, there is provided an objective lens device according to the present invention comprising: a light source; an objective lens provided along a light path from the light source, facing a disc and having a predetermined effective diameter; a beam splitter provided in the light path between the light controlling means and the light source; and a photodetector for detecting the light reflected from the disc and split by the beam splitter.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

In the present invention, among the light beams incident to the photodetector, the light beam around the central axis of the light traveling path, i.e., the light of the intermediate region between near- and far-axis regions (having many components of spherical aberration), is blocked or shielded so that the light having less components of spherical aberration reaches the photodetector, thereby stabilizing a focus signal. Thus, a disc drive which is used compatibly for discs having different thicknesses, e.g., a 1.2 mm compact disc and a 0.6 mm digital video disc, is easily manufactured at a low cost.

Figure 1:
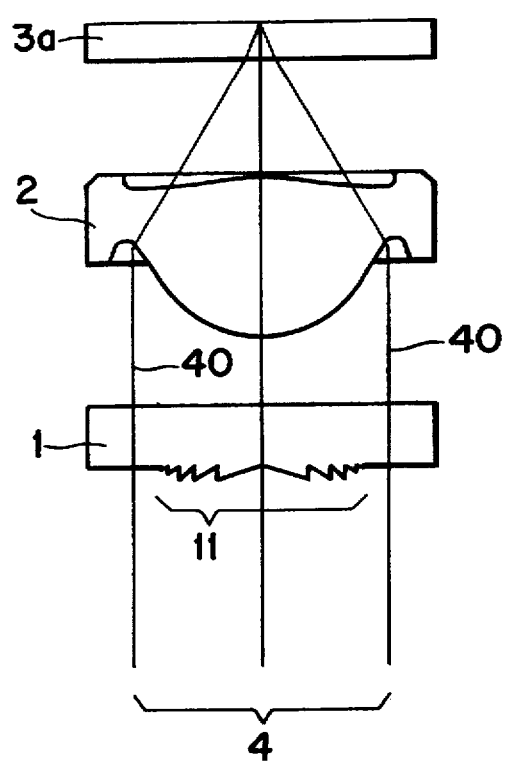
FIGS. 1 and 2 are schematic diagrams of a conventional optical pickup device having a hologram lens, showing the states where a light beam is focused onto a thin disc and a thick disc, respectively.
Figure 2:
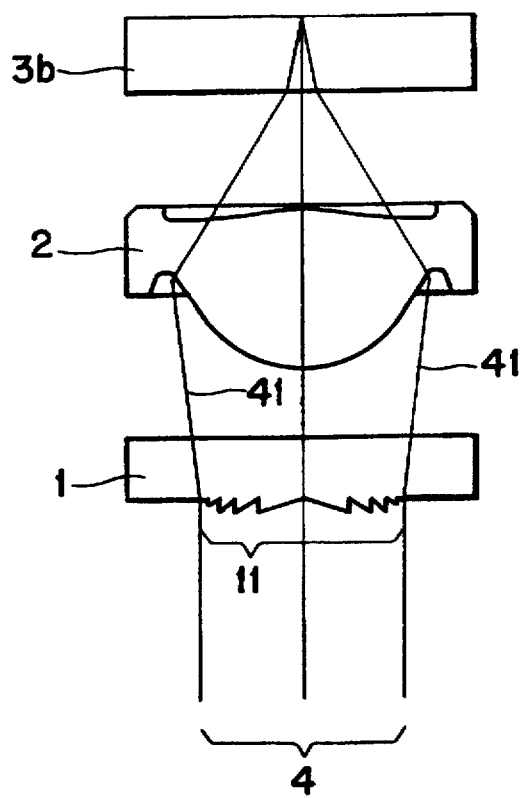
Figure 3:
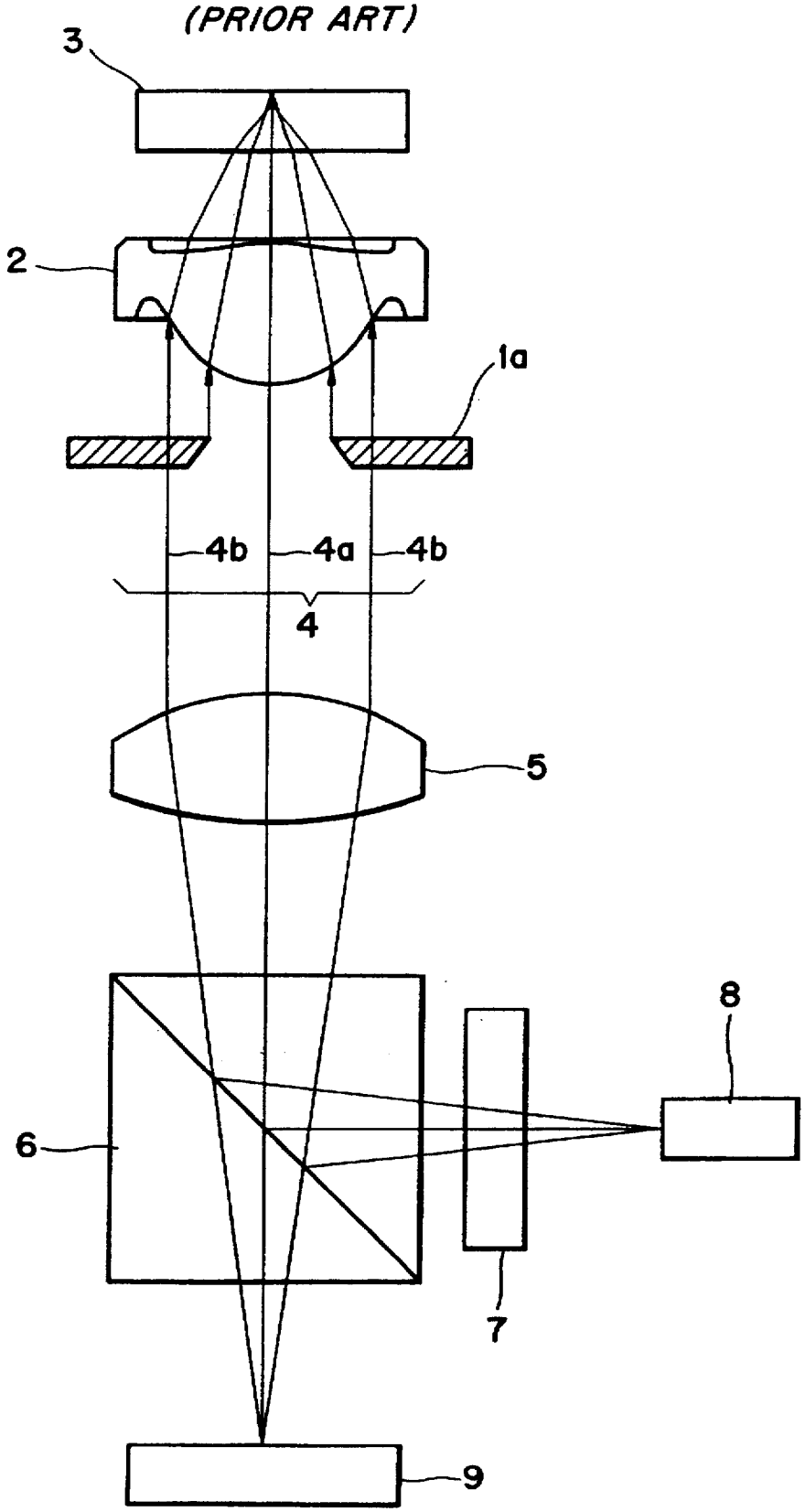
FIG. 3 is a schematic diagram of another conventional optical pickup device.
Figure 4:
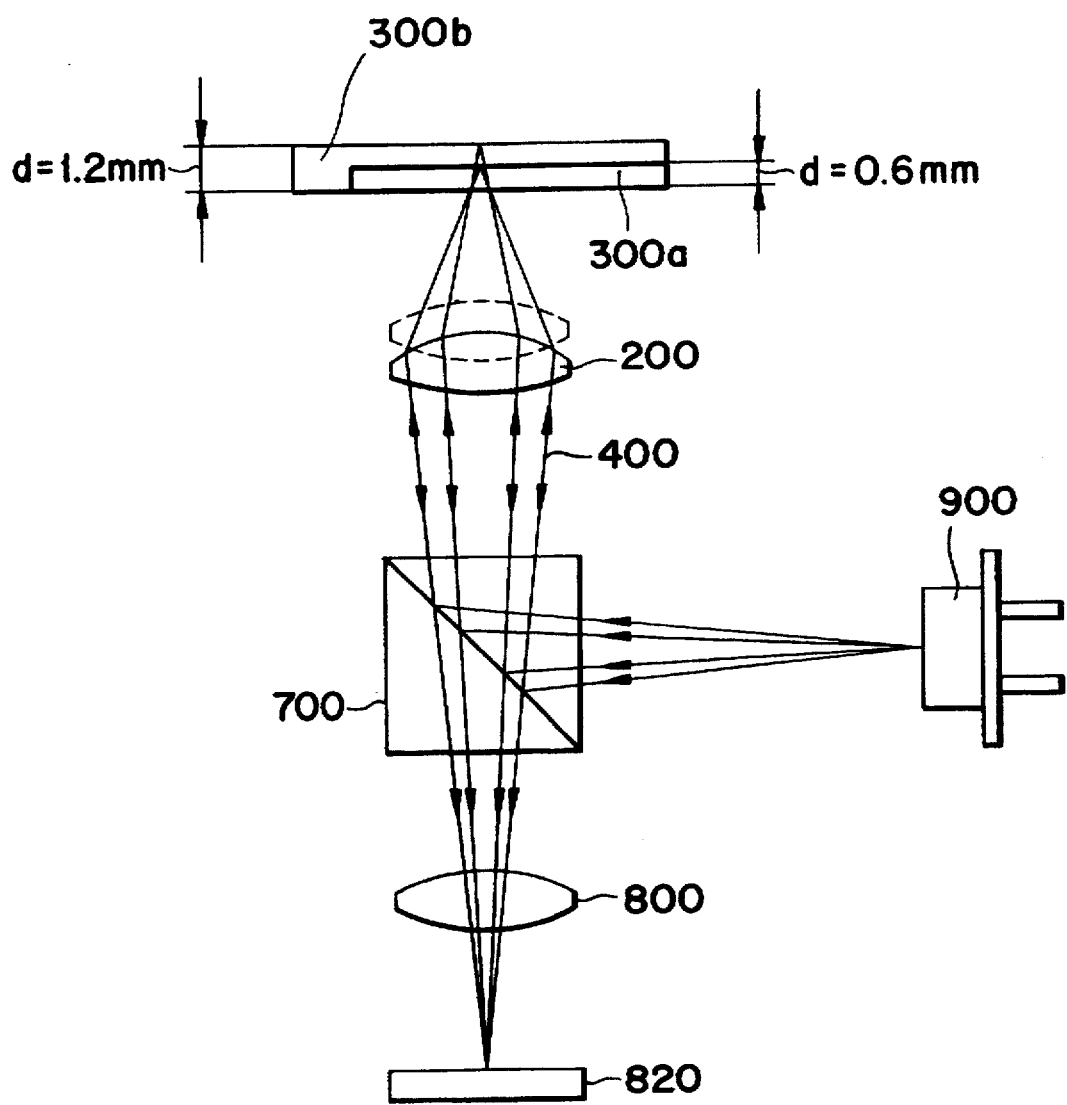
FIG. 4 is a schematic diagram of an optical pickup according to the present invention.
Figure 5:
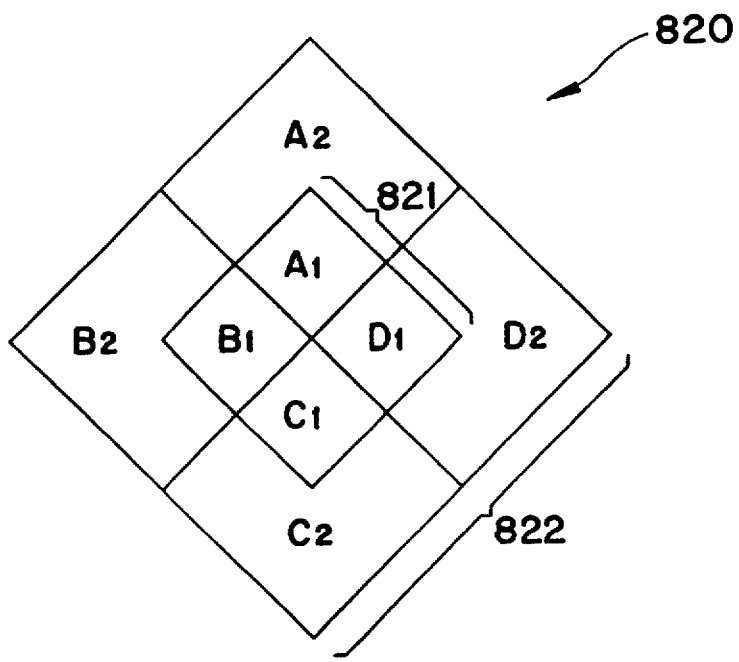
FIG. 5 is a plan view of an eight-segment photodetector adopted for the optical pickup device according to the present invention.

FIG. 4 is a schematic diagram of an optical pickup device according to the present invention, in which the light focusing states of a thin disc and a thick disc are compared.

In FIG. 4, reference numerals 300a and 300b represent a thin disc (e.g., 0.6 mm digital video disc) and a thick disc (e.g., 1.2 mm compact disc), respectively.

A general objective lens 200 is positioned in front of the digital video disc 300a or compact disc 300b. The objective lens 200 having a predetermined effective diameter focuses an incident light 400 from a light source 900 onto the disc 300a or 300b, or receives the light reflected from the disc 300a or 300b. A beam splitter 700 for reflecting the light from the light source 900 into the objective lens 200 and transmitting the light reflected from the disc 300a or 300b is provided between the objective lens 200 and the light source 900. A photodetector 820 as a feature of the present invention is provided to the rear of the detecting lens 800.

The photodetector 820 has the following structural characteristics.

The photodetector 820 is square in terms of its overall structure. A first detection region 821 divided into four parts is positioned in the center and a second detection region 822 divided into four parts is provided around the first detection region 821. The first detection region 821 includes four square light detecting elements A1, B1, C1 and D1 and the second light detecting region 822 includes four L-shaped light detection elements A2, B2, C2 and D2.

The first detection region 821 is large enough to encompass all of the incident light beams when the objective lens 200 is in an in-focus state with respect to the thin disc (digital video disc) 300a. The second detection region 822 receives the light corresponding to the region extended by an astigmatism when the objective lens 200 is out of focus. Particularly, when the objective lens 200 is in focus with respect to the thick disc 300b, the second detection region 822 is as large as an outer square drawn tangentially with respect to the light distributed region. This will be described with reference to FIGS. 6–12 for better understanding.

Figure 6:
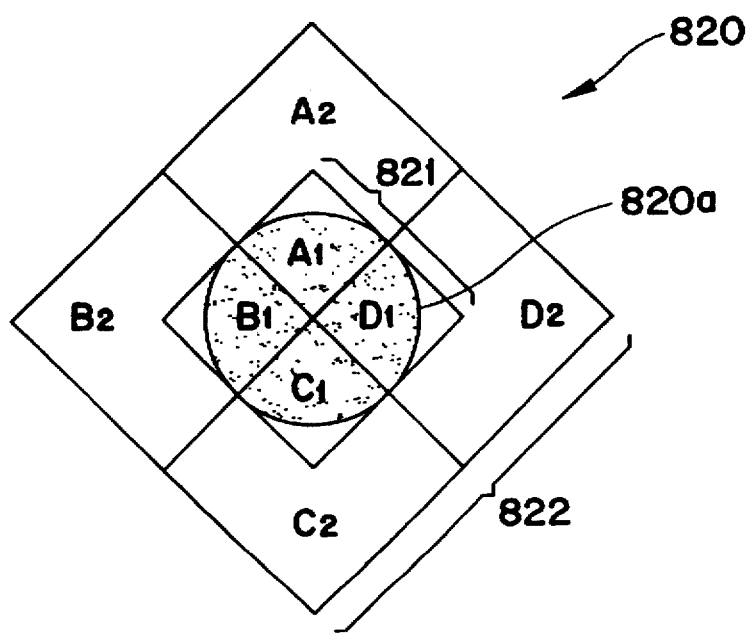
FIGS. 6–8 and 9–11 are plan views showing the light receiving distribution of the eight-segment photodetector, formed by the position of an objective lens with respect to a thin disc and a thick disc, respectively.

FIG. 6 shows the light distribution when the objective lens 200 is exactly in focus with respect to the thin disc 300a. The second detection region 822 is internally tangent to the light distributed region 820a.

Figure 7:
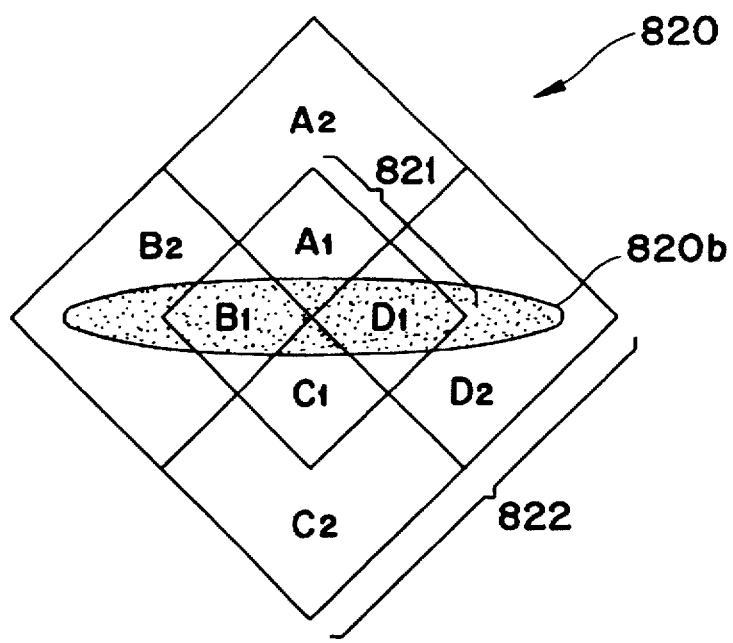

FIG. 7 shows the light distribution when the objective lens 200 is in a far-focus state with respect to the thin disc 300a. In this case, as shown in FIG. 7, the light distributed region 820b is horizontally elongated, that is, throughout the horizontal light receiving elements B2, B1, A1, C1, D1 and D2.

Figure 8:
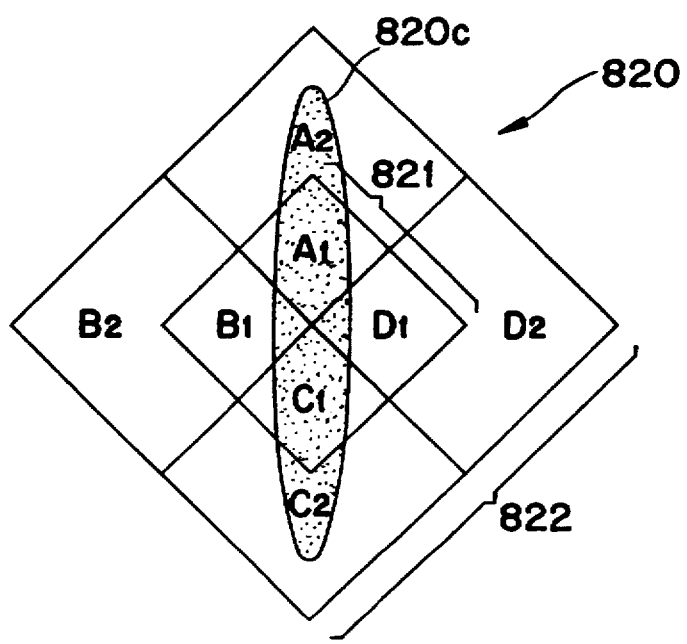

FIG. 8 shows the light distribution when the objective lens 200 is in a near-focus state with respect to the thin disc 300a. In this case, as shown in FIG. 8, the light distributed region 820c is vertically elongated, that is, throughout the vertical light receiving elements A2, A1, B1, D1, C1 and C2.

Figure 9:
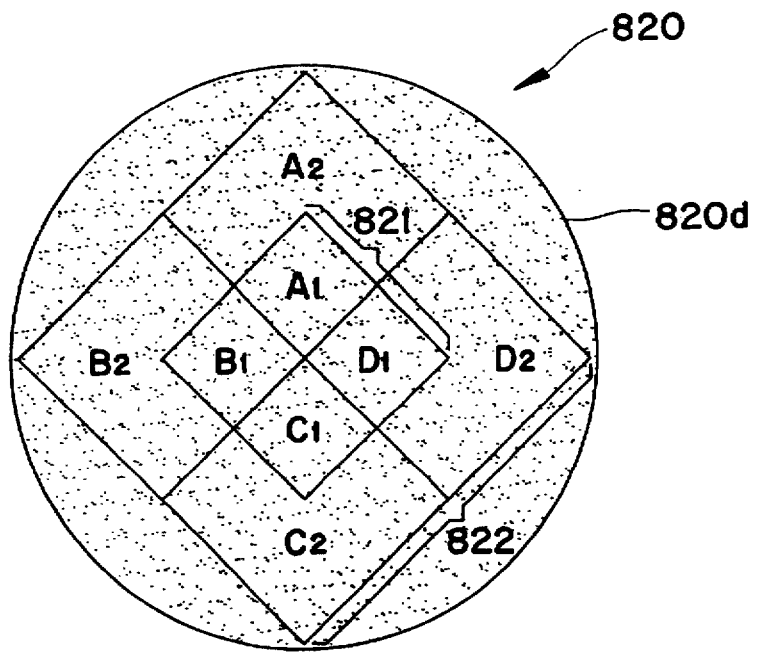

As shown in FIG. 9, when the objective lens 200 is exactly in focus with respect to the thick disc 300b, the light distributed region 820d is internally tangent to the second detection region 822.

Figure 10:
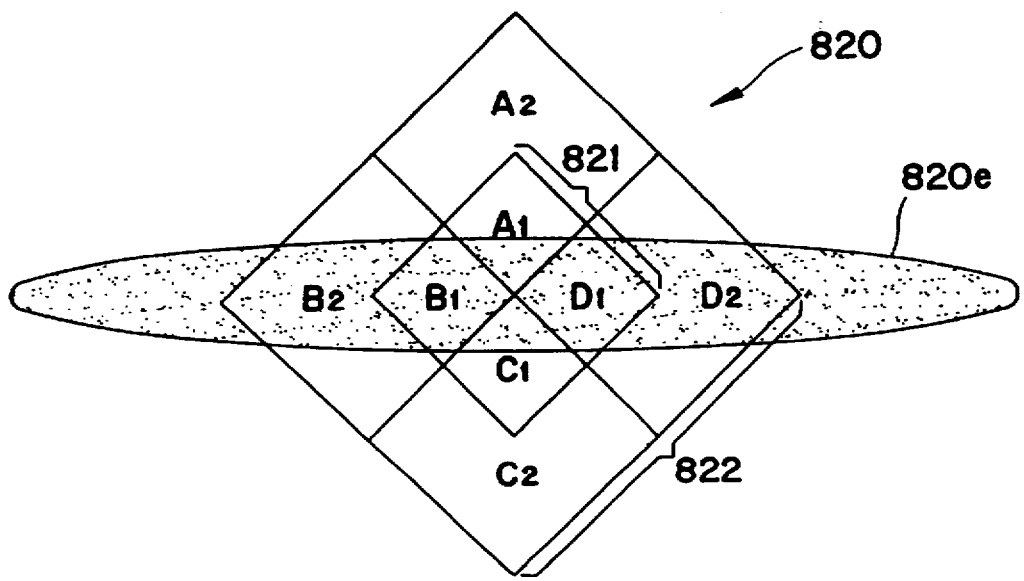

As shown in FIG. 10, when the objective lens 200 is in a far-focus state with respect to the thick disc 300b, the light distributed region 820d is horizontally elongated, that is, throughout the horizontal light receiving elements B2, B1, A1, C1, D1 and D2.

Figure 11:
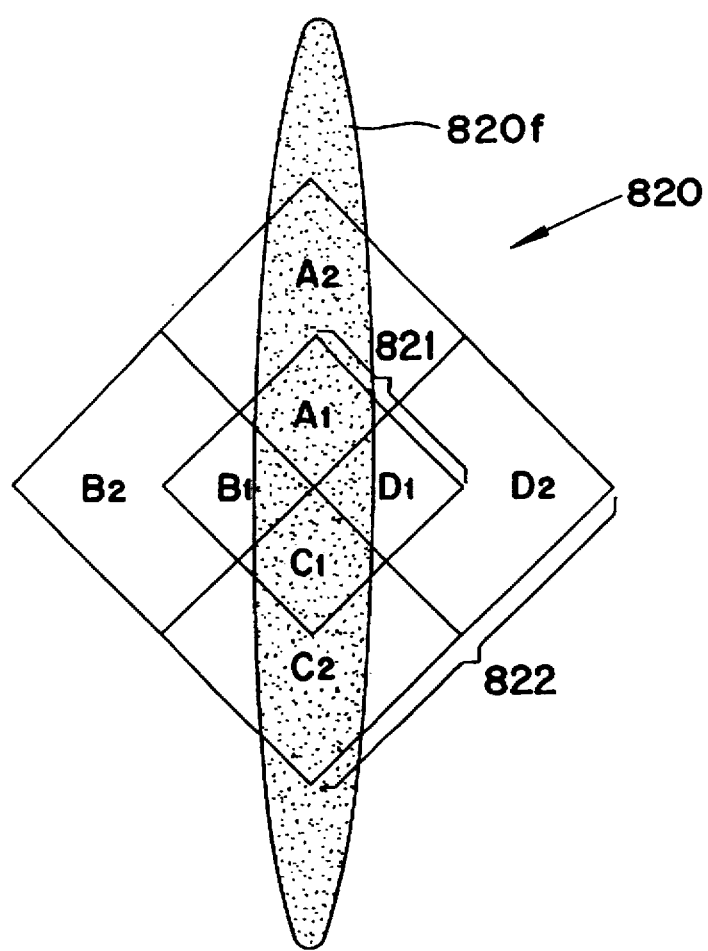

As shown in FIG. 11, when the objective lens 200 is in a near-focus state with respect to the thick disc 300b, the light distributed region 820f is vertically elongated, that is, throughout the vertical light receiving elements A2, A1, B1, D1, C1 and C2.

As described above, according to the present invention, only the near-axis light having small spherical aberration reaches the first detection region 821.

In driving the optical pickup device according to the present invention, when information is reproduced or recorded from a thin disc (digital video disc) 300a, signals generated from both the first and second detection regions 821 and 822 are used. Thus, when using the thin disc, the focus error signal is A1+A2+C1+C2−B1−B2−D1−D2. When information is reproduced or recorded from a thick disc, only the signal from the first detection region 821 is used. Thus, when using the thick disc, the focus error signal is A1+C1−B1−D1.

Figure 12:
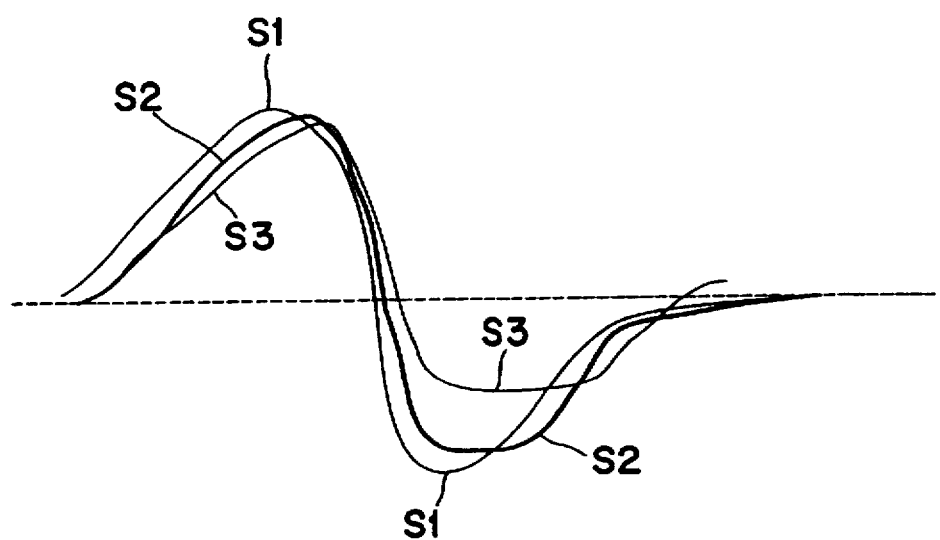
FIG. 12 is a curve of a focus signal obtained from the eight-segment photodetector shown in FIG. 5.

FIG. 12 is a curve for comparing focus signals S1 and S2 obtained from the signal detected from the second detection region 822 having widths of 60 μm and 90 μm, respectively, with a focus signal S3 obtained from all the signals detected from the first and second detection regions 821 and 822 having a width of 160 μm when the thick disc is used. Accordingly, in the case of using the thick disc 300b, when the first detection region 821 is used, a more stable focus signal S1 can be obtained, compared to the case when the first and second detection regions 821 and 822 are both used. Also, when the thick disc is used, the far axis light having large spherical aberration is made to be widely distributed in the second detection region 822. Thus, the focus signal is increased and the symmetry for the focusing direction can be maintained.

As described above, according to the optical pickup device of the present invention, in order to read information from at least two kinds of discs having different thicknesses, a light controlling film and an eight-segment photodetector are adopted so that only the near-axis light is received in the photodetector when the information is read from the thick disc and the near- and far-axis light is received in the photodetector when the information is read from the thin disc. The photodetector is divided into two parts and each detection region is subdivided into four parts. The number of divided parts may be increased as needed. By doing so, when the thick disc is used, a signal corresponding to the near axis region is obtained. When the thin disc is used, a relatively stable signal corresponding to both regions, i.e., the near and far axes, is obtained.

As described above, the optical pickup device according to the present invention adopts a light blocking or scattering means which is simple and easy to fabricate, e.g., a light controlling film formed on a transparent member or a light blocking or scattering groove formed on the objective lens, whereas the conventional optical pickup device adopts a complex and expensive hologram lens. Also, since the light is used without being separated by a hologram lens, the optical pickup device according to the present invention has an improved light utilizing efficiency.

The invention has been described by way of exemplary embodiments to which it is not limited. Variations and modifications will occur to skilled artisans which do not depart from the spirit and scope of the present invention as recited in the claims appended hereto.

What is claimed is:

1. An optical pickup device comprising:

a light source;

an objective lens provided along the light path from said light source facing the plane of a disc and having a predetermined effective diameter;

a beam splitter provided between said objective lens and a photodetector; and said photodetector for detecting the light split by said beam splitter and reflected from said disc, wherein said photodetector has a first detection region and a second detection region provided in the peripheral portion of said first detection region and wherein said second detection region of said photodetector is divided into at least four parts.

2. An optical pickup device as claimed in claim 1, wherein said photodetector is square.

3. An optical pickup device as claimed in claim 1, wherein said first detection region is large enough to encompass the incident light reflected from a thin disc when said optical pickup device is in a far-focus region and in a near-focus region.

4. An optical pickup device as claimed in claim 3, wherein said photodetector is square.

5. An optical pickup device as claimed in claim 3, wherein said first and second detection regions of said photodetector are each divided into four parts.

6. An optical pickup device as claimed in claim 5, wherein said photodetector is square.

7. An optical pickup device as claimed in claim 5, wherein said four parts of said second detection region are each "L" shaped.

8. An optical pickup device as claimed in claim 5, wherein said four parts of said first detection region are each square shaped.

* * * * *